United States Patent
Machida

(10) Patent No.: US 8,297,079 B2
(45) Date of Patent: Oct. 30, 2012

(54) METHOD OF MANUFACTURING POROUS GLASS BASE MATERIAL USED FOR OPTICAL FIBERS, AND GLASS BASE MATERIAL

(75) Inventor: Hiroshi Machida, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1359 days.

(21) Appl. No.: 10/583,971

(22) PCT Filed: Dec. 28, 2004

(86) PCT No.: PCT/JP2004/019644
§ 371 (c)(1),
(2), (4) Date: Jun. 22, 2006

(87) PCT Pub. No.: WO2005/066085
PCT Pub. Date: Jul. 21, 2005

(65) Prior Publication Data
US 2007/0163300 A1    Jul. 19, 2007

(30) Foreign Application Priority Data
Jan. 7, 2004   (JP) ................................. 2004-002128

(51) Int. Cl.
*C03B 37/018* (2006.01)
(52) U.S. Cl. ............................... 65/384; 65/413; 65/421
(58) Field of Classification Search ................ 65/384, 65/413, 421
See application file for complete search history.

(56) References Cited

U.S. PATENT DOCUMENTS

| | | | | |
|---|---|---|---|---|
| 3,565,345 A | * | 2/1971 | Moltzan | 239/422 |
| 4,317,667 A | * | 3/1982 | Spainhour | 65/27 |
| 4,367,085 A | * | 1/1983 | Suto et al. | 65/415 |
| 4,428,762 A | * | 1/1984 | Andrejco et al. | 65/414 |
| 4,465,708 A | * | 8/1984 | Fanucci et al. | 65/416 |
| 4,474,593 A | * | 10/1984 | Andrejco et al. | 65/415 |
| 4,618,354 A | * | 10/1986 | Suda et al. | 65/416 |
| 4,661,140 A | * | 4/1987 | Takimoto et al. | 65/157 |
| 4,684,383 A | * | 8/1987 | Cavender et al. | 65/426 |
| 4,801,322 A | * | 1/1989 | Suda et al. | 65/144 |
| 5,114,338 A | * | 5/1992 | Tsuchiya et al. | 432/206 |
| 5,558,693 A | * | 9/1996 | Sarkar | 65/382 |
| 5,735,928 A | * | 4/1998 | Sayce et al. | 65/531 |
| 5,958,102 A | * | 9/1999 | Shimada et al. | 65/382 |
| 6,321,573 B1 | * | 11/2001 | Fritsche et al. | 65/421 |
| 2003/0024273 A1 | * | 2/2003 | Ishihara | 65/382 |
| 2003/0101772 A1 | | 6/2003 | Itoh et al. | |
| 2004/0129030 A1 | * | 7/2004 | Tanada et al. | 65/397 |

FOREIGN PATENT DOCUMENTS

| | | |
|---|---|---|
| CN | 1421409 A | 6/2003 |
| JP | 61-86440 | 5/1986 |
| JP | 64-65040 | 3/1989 |
| JP | 1-203238 | 8/1989 |
| JP | 4-55336 | 2/1992 |
| JP | 7-144928 | 6/1995 |
| JP | 10-101343 | 4/1998 |
| JP | 11-349345 | 12/1999 |
| JP | 2001-294429 | 10/2001 |

OTHER PUBLICATIONS

Chinese Office Action dated Mar. 27, 2009 with English-Language Translation.

* cited by examiner

*Primary Examiner* — John Hoffmann
(74) *Attorney, Agent, or Firm* — McGinn IP Law Group, PLLC

(57) ABSTRACT

The method of manufacturing porous glass base material for optical fiber includes that flame-hydrolyzing raw materials for glass in oxyhydrogen flame, depositing the generated glass fine particles on a rotating target to form porous glass base material, dehydrating and sintering the porous glass base material to transform into clear glass. The method features, in terms of the surface temperature of said porous glass base material, which changes as the burner used for depositing glass fine particle is moved relatively to said target, the temperature difference between the surface temperature of the porous glass base material touching the burner flame Ta and the surface temperature of the porous glass base material before touching the flame Tb, that is Ta−Tb, is adjusted to be within the range from 200 to 700 degrees centigrade.

18 Claims, No Drawings

METHOD OF MANUFACTURING POROUS GLASS BASE MATERIAL USED FOR OPTICAL FIBERS, AND GLASS BASE MATERIAL

TECHNICAL FIELD

The present invention relates to a method of manufacturing porous glass base material, in which in the outside vapor deposition (OVD) process, glass fine particles generated by flame hydrolysis are deposited on a starting material to make porous glass base material, especially the method of manufacturing porous glass base material with improved efficiency in the deposition of glass fine particle, and glass base material.

In the designated states which accepts the incorporation by reference, the contents of the following application is incorporated herein by reference to be a part of the description of the present application.

Japanese patent application No. 2004-2128,
Filed on Jan. 7, 2004

BACKGROUND ART

In a typical method of manufacturing silica glass used for optical fibers, referred as just optical fiber base material, generally using the OVD process, raw materials for glass are flame-hydrolyzed in oxyhydrogen flame, generated glass fine particles are deposited on a rotating target rod to make a major part of porous glass base material, and then the porous glass base material is dehydrated and transformed into clear glass.

As the optical fiber market has been faltering recently, lower-cost optical fibers are demanded. Reducing the manufacturing cost is one of the most important issues in manufacturing optical fiber base material as precursor of optical fibers.

The glass fine particles generated by flame hydrolysis are carried in flame flow, blown against and deposited on the porous glass base material, but a significant amount, almost the half is carried away in effluent gas to the outside of the system and disposed of without being deposited. The method is required, in which the glass fine particles generated from supplied raw materials for glass is deposited on the porous glass base material with higher efficiency.

To deposit the glass fine particles with high efficiency in the above OVD process, it is required to examine the following factors in detail: the relative rate and distance between the target rod as the starting base material and the burner used for depositing glass fine particles; the structure of the burner used for deposition; and the flow rate of gas supplied to the depositing burner.

If you seek the optimal condition for each of the factors, it takes a lot of time and money. Despite you could get the optimal condition for each factor, when each factor changes, you should reexamine that.

Patent Document 1 discloses that using a concentric multi tube depositing burner, when glass fine particles generated by flame-hydrolyzing raw materials for glass are deposited on the target, Reynolds value Re of the channel of raw material in the depositing burner is controlled depending on the diameter of the glowing target during deposition so that the deposition efficiency can be improved.

To improve the deposition efficiency in this method, however, the Re value should be decreased. It is difficult, however, to keep the deposition rate high as improving the deposition efficiency.

It has been known to solve the problem easily that the surface of soot is forcedly cooled down.

The following may be a reason why the deposition rate is improved when the porous glass base material is forced to be cooled. There may cause a heat migration phenomenon, which may be the basic mechanism in depositing the glass fine particles generated by the depositing burner on the surface of the target. The above phenomenon can explain that when there exist particles in the atmosphere, and the temperature of ambient gas has a gradient, the particles migrate from the high temperature area to the low temperature area.

In the OVD process, the surface of the porous glass base material is forced to be cooled, except for the area where the particles which are generated by flame hydrolysis, blown by the relatively moving depositing burner, and carried in flame to directly hit the target. When the depositing burner returns to the cooled area, the temperature gradient increases as compared the cooled area with the neighboring area around the surface of the base material which has a high temperature due to the flame during the deposition. This causes the glass fine particles to migrate to the low temperature area so that the deposition efficiency is improved.

There are some prior arts like below disclosing methods of cooling the deposition surface of glass base material.

Patent Document 2 discloses the method in which an outlet of cooling gas is disposed against the deposition surface and immediately above the depositing burner, and nitrogen gas $N_2$ or argon gas Ar is blown against the deposition surface to cool the porous glass base material. Patent Document 3 discloses the method in which helium gas He as a cooling gas is blown against the starting base material to cool to the surface temperature of about 500 degrees, and then the deposition starts to form porous glass layer. Patent Document 4 discloses the method in which an outlet of cooling gas is disposed against the deposition surface and immediately above the depositing burner, ion jet flow generated by corona discharge cools the surface of the porous glass base material during the deposition. Patent Document 5 discloses the method in which a part of the surface of the rotating target where the flame isn't touching is forced to be cooled by the water jet flow from a water cooled nozzle.

Patent Document 1: The Japanese laid-open patent No. 2001-294429
Patent Document 2: Japanese laid-open patent No. 1986-86440
Patent Document 3: Japanese laid-open patent No. 1989-203238
Patent Document 4: Japanese laid-open patent No. 1989-65040
Patent Document 5: Japanese laid-open patent No. 1992-55336

DISCLOSURE OF THE INVENTION

Problems to be Solved by the Invention

The porous glass base materials made with those methods was found to have the following problems.

For the purpose of improving the deposition efficiency, it is learned that an excessive cooling makes a large surface temperature difference between the outer layer and the inner layer in the porous glass base material. This causes the difference between contraction ratio of the outer layer and the inner layer, which may make cracks on the surface of the glass base material.

It is an object of the invention to provide a method of manufacturing porous glass base material for optical fiber and glass base material. The method includes cooling the surface of the porous glass base material during deposition without generating cracks on the surface of the porous glass base material so that the deposit ratio of the glass fine particles is improved.

Means for Solving the Problems

The precise research by the present inventors found the solution for the above problems. The method of manufacturing porous glass base material for optical fiber, related to the present invention, includes that flame-hydrolyzing raw materials for glass in oxyhydrogen flame, depositing the generated glass fine particles on a rotating target to form porous glass base material, dehydrating and sintering the porous glass base material to transform into clear glass. The method features, in terms of the surface temperature of said porous glass base material, which changes as the burner used for depositing glass fine particle is moved relatively to said target, the temperature difference between the surface temperature of the porous glass base material touching the burner flame Ta and the surface temperature of the porous glass base material before touching the flame Tb, that is Ta−Tb, is adjusted to be within the range from 200 degrees to 700 degrees centigrade. When the temperature difference Ta−Tb is adjusted, the airflow and/or the flow rate are adjusted at the interfaces such as an exhaust outlet and/or a gas jet orifice.

The porous glass base material for optical fiber made in such method is dehydrated, sintered, and vitrified, which can provide glass base material for optical fiber at low cost.

The above description of the present invention doesn't cite all the features of the present invention. The sub-combinations of these features may also be inventions.

Effect of the Invention

According to the method of manufacturing porous glass base material for optical fiber, related to the present invention, the surface temperature difference of the porous glass base material before and after touching the burner flame Ta−Tb is adjusted to be within the range from 200 degrees to 700 degrees centigrade during the deposition so that the porous glass material has no crack on the surface thereof, and the deposition rate of glass fine particles can be improved.

The porous glass base material for optical fiber made in such method is dehydrated, sintered, and transformed into clear glass, which can provide glass base material for optical fiber at low cost.

BEST MODE FOR CARRYING OUT THE INVENTION

The following description explains the present invention with embodiments. The embodiments described below do not limit the invention claimed herein. All of the combinations described on the embodiments are not essential to the solutions of the present invention.

The glass particle deposition area is displaced as the depositing burner moves, but the temperature of the deposition area is changed before and after being touched by the burner flame. The amount of hydrogen and oxygen supplied to the depositing burner is adjusted so that the surface temperature difference of the porous glass base material before and after being touched by the burner flame Ta−Tb is within the range from 200 to 700 degrees centigrade. This can prevent the surface of the porous glass base material from cracks, and make the glass particle deposition rate improved.

If the surface temperature difference Ta−Tb is lower than 200 degrees centigrade, forced cooling operation can hardly increase the deposition rate. If the surface temperature difference is larger than 700 degrees centigrade, cracks would be generated during deposition so that the porous glass base material cannot be used as a product.

The following describes the present invention more precisely using the following comparative examples and embodiments. The present invention, however, cannot be limited by those and can be variously embodied.

COMPARATIVE EXAMPLE 1

In the OVD process, a target rod of diameter 50 mm $\phi$ made of silica glass was mounted on a manufacturing machine, and four concentric multi tube depositing burners were aligned at 150 mm intervals to deposit glass fine particles.

The used concentric multi tube depositing burner comprises five tubes. In the early deposition, the innermost tube was supplied with raw material gas or silicon tetrachloride $SiCl_4$ of 1 Nl/min/burner and oxygen 8 Nl/min/burner, the third tube was supplied with hydrogen 50 Nl/min/burner, and the fifth tube was supplied with oxygen 20 Nl/min/burner respectively. The raw material gas, oxygen, and hydrogen were adjusted as the outer diameter of soot so that at the end of the deposition, the inner most tube had the raw material gas or silicon tetrachloride $SiCl_4$ of 10 Nl/min/burner and oxygen of 20 Nl/min/burner, the third tube had hydrogen of 200 Nl/min/burner, the fourth tube had Nitrogen 4 Nl/min/burner, and the fifth tube had Oxygen of 60 Nl/min/burner.

On the above conditions, the depositing burner was continued to be relatively moved against the target at the speed of 100 mm/min until the outer diameter of the porous glass base material became to be 300 mm $\phi$ by deposition. During the above deposition, the surface temperature difference Ta−Tb was 100 degrees. Ta stands for the surface temperature of the porous glass base material touching the burner flame. Tb stands for the surface temperature of the porous glass base material before touching the flame.

On the above condition, the deposition was continued for 50 hours. The resulted porous glass base material had no cracks on the surface thereof, but the deposition rate was 2000 g/hr, and the deposition efficiency was 0.50.

Embodiments 1-6 and Comparative Example 2

The used apparatus has means of cooling the surface of the porous glass base material, or one or more inlets.

A target rod of 50 mm $\phi$ diameter made of silica glass was mounted on a manufacturing machine, and using a concentric multi tube burner in the OVD process the porous glass base material is made by deposition. For the depositing burner, five-tube depositing burner was used. Each tube is supplied with the following gas: tetrachloride $SiCl_4$ and oxygen $O_2$ to the innermost tube; air to the second tube; helium $H_2$ to the third tube; nitrogen $N_2$ to the fourth tube; and oxygen $O_2$ to the fifth tube.

The conditions of supplying gas are the same as the above comparative example 1. The depositing burner was continued to be relatively moved against the target at the speed of 100 mm/min until the outer diameter of the porous glass base material became 300 mm $\phi$. During the deposition, the surface temperature difference Ta−Tb was varied.

Table 1 shows the resulted values of deposition and the surface temperature differences Ta−Tb.

In the second comparative example shown in the table, in which the surface temperature difference Ta−TB was 880 degrees centigrade, the porous glass base material generated cracks on the surface thereof during the deposition, so the deposition was gave up.

The surface temperature was measured by thermography, but other means may be used for the measurement.

TABLE 1

| No. | (Ta − Tb) [degree] | Adjustment in surface temperature | Deposition period [hr] | Deposition rate [—] | Deposition rate [g/hr] | Crack on the surface |
|---|---|---|---|---|---|---|
| Comparative example 1 | 100 | No adjustment | 50.0 | 0.50 | 2000 | No crack |
| Embodiment 1 | 200 | Adjusted | 49.0 | 0.51 | 2040 | No crack |
| Embodiment 2 | 300 | Adjusted | 48.1 | 0.52 | 2080 | No crack |
| Embodiment 3 | 400 | Adjusted | 46.3 | 0.54 | 2160 | No crack |
| Embodiment 4 | 500 | Adjusted | 45.5 | 0.55 | 2200 | No crack |
| Embodiment 5 | 600 | Adjusted | 43.9 | 0.57 | 2280 | No crack |
| Embodiment 6 | 700 | Adjusted | 42.4 | 0.59 | 2360 | No crack |
| Comparative example 2 | 800 | Adjusted | Deposition stopped at the diameter of 250 mm φ | | | cracks |

Apparently from Table 1, in Embodiments 1-6, in which the surface temperature difference Ta−Tb was within the range from 200 to 700 degrees centigrade, there happened no cracks, and the deposition rates were within 0.51 to 0.59. Such deposition rate is higher than prior art, so the deposition rate of glass fine particles could be improved.

The above description explaining the present invention with the embodiments does not limit the technical scope of the invention to the above description of the embodiments. It is apparent for those in the art that various modifications or improvements can be made to the embodiments described above. It is also apparent from what we claim that other embodiments with such modifications or improvements are included in the technical scope of the present invention.

INDUSTRIAL APPLICABILITY

According to the method of manufacturing porous glass base material for optical fiber, related to the present invention, the deposition rate of glass fine particles can be improved, and the cost of manufacturing optical fibers can be decreased.

The invention claimed is:

1. A method of manufacturing porous glass base material for optical fiber, said method comprising:
    flame-hydrolyzing raw materials in an oxyhydrogen flame to generate glass fine particles;
    depositing the glass fine particles on a rotating target to form said porous glass base material by using a burner;
    moving said burner relative to said rotating target such that there is a moving area, on a surface of the rotating target, where the glass fine particles are carried in flame to directly hit the rotating target;
    cooling a surface of the porous glass base material, during said depositing; and
    adjusting a temperature difference (Ta−Tb) between a surface temperature of said moving area (Ta) and a surface temperature of an area of said porous glass base material outside said moving area (Tb) to be within a range from 200° C. to 700° C.

2. The method of manufacturing porous glass base material for optical fiber according to claim 1, wherein said burner comprises a concentric multi tube burner.

3. The method of manufacturing porous glass base material for optical fiber according to claim 1, wherein said glass fine particles are deposited at a rate in a range of 2040 g/hr to 2360 g/hr.

4. The method of manufacturing porous glass base material for optical fiber according to claim 3, wherein the target has a diameter of 50 mm when said depositing begins, and
    wherein the porous glass base material has a diameter of 300 mm when said depositing ends.

5. The method of manufacturing porous glass base material for optical fiber according to claim 3, wherein said burner is one of four burners aligned at 150 mm intervals.

6. The method of manufacturing porous glass base material for optical fiber according to claim 1, wherein the temperature difference (Ta−Tb) is within a range from 200° C. to 400° C.

7. The method of manufacturing porous glass base material for optical fiber according to claim 1, wherein the temperature difference (Ta−Tb) is within a range from 500° C. to 700° C.

8. The method of manufacturing porous glass base material for optical fiber according to claim 1, wherein a deposition efficiency is in a range of 0.51 to 0.59.

9. The method of manufacturing porous glass base material for optical fiber according to claim 1, wherein said glass fine particles are deposited at a rate in a range of 2040 g/hr to 2160 g/hr.

10. The method of manufacturing porous glass base material for optical fiber according to claim 1, wherein said glass fine particles are deposited at a rate in a range of 2200 g/hr to 2360 g/hr.

11. The method of manufacturing porous glass base material for optical fiber according to claim 10, wherein the target has a diameter of 50 mm when said depositing begins, and
    wherein the porous glass base material has a diameter of 300 mm when said depositing ends.

12. The method of manufacturing porous glass base material for optical fiber according to claim 10, wherein said burner is one of four burners aligned at 150 mm intervals.

13. The method of manufacturing porous glass base material for optical fiber according to claim 1, wherein a deposition efficiency is in a range of 0.51 to 0.54.

14. The method of manufacturing porous glass base material for optical fiber according to claim 1, wherein a deposition efficiency is in a range of 0.55 to 0.59.

15. The method of manufacturing porous glass base material for optical fiber according to claim 14, wherein said burner comprises a concentric multi tube burner, the method further comprising:
    supplying $SiCl_4$ at about 1 Nl/min and $O_2$ at about 8 Nl/min to a first tube of said concentric multi tube burner early in said depositing;
    supplying $SiCl_4$ at about 10 Nl/min and $O_2$ at about 20 Nl/min to a first tube of said concentric multi tube burner near the end of said depositing;
    supplying air to a second tube of said concentric multi tube burner during said depositing;

supplying H$_2$ at about 50 Nl/min to a third tube of said concentric multi tube burner early in said depositing;

supplying H$_2$ at about 200 Nl/min to a third tube of said concentric multi tube burner near the end of said depositing;

supplying N$_2$ at about 4 Nl/min to a fourth tube of said concentric multi tube burner near the end of said depositing;

supplying O$_2$ at about 20 Nl/min to a fifth tube of said concentric multi tube burner early in said depositing; and supplying O$_2$ at about 60 Nl/min to a fifth tube of said concentric multi tube burner near the end of said depositing.

16. A method of manufacturing glass base material for optical fiber, comprising:

the method of manufacturing porous glass base material according to claim 1; and dehydrating and sintering said porous glass base material to transform said porous glass base material into clear glass.

17. A method of manufacturing porous glass base material for optical fiber, said method comprising:

flame-hydrolyzing raw materials in an oxyhydrogen flame to generate glass fine particles;

depositing the glass fine particles on a rotating target to form said porous glass base material by using a concentric multi tube burner;

moving said concentric multi tube burner relative to said rotating target such that there is a moving area, on a surface of the rotating target, where the glass fine particles are carried in flame to directly hit the rotating target;

cooling a surface of the porous glass base material, during said depositing, while adjusting a temperature difference (Ta−Tb) between a surface temperature of said moving area (Ta) and a surface temperature of an area of said porous glass base material outside said moving area (Tb) to be within a range from 200° C. to 700° C., supplying SiCl$_4$ and O$_2$ to a first tube of said concentric multi tube burner during said depositing;

supplying air to a second tube of said concentric multi tube burner during said depositing;

supplying H$_2$ to a third tube of said concentric multi tube burner during said depositing;

supplying N$_2$ to a fourth tube of said concentric multi tube burner during said depositing; and supplying O$_2$ to a fifth tube of said concentric multi tube burner during said depositing.

18. The method of manufacturing porous glass base material for optical fiber according to claim 8, wherein said burner comprises a concentric multi tube burner, the method further comprising:

supplying SiCl$_4$ at about 1 Nl/min and O$_2$ at about 8 Nl/min to a first tube of said concentric multi tube burner early in said depositing;

supplying SiCl$_4$ at about 10 Nl/min and O$_2$ at about 20 Nl/min to a first tube of said concentric multi tube burner near the end of said depositing;

supplying air to a second tube of said concentric multi tube burner during said depositing;

supplying H$_2$ at about 50 Nl/min to a third tube of said concentric multi tube burner early in said depositing;

supplying H$_2$ at about 200 Nl/min to a third tube of said concentric multi tube burner near the end of said depositing;

supplying N$_2$ at about 4 Nl/min to a fourth tube of said concentric multi tube burner near the end of said depositing;

supplying O$_2$ at about 20 Nl/min to a fifth tube of said concentric multi tube burner early in said depositing; and supplying O$_2$ at about 60 Nl/min to a fifth tube of said concentric multi tube burner near the end of said depositing.

* * * * *